United States Patent Office.

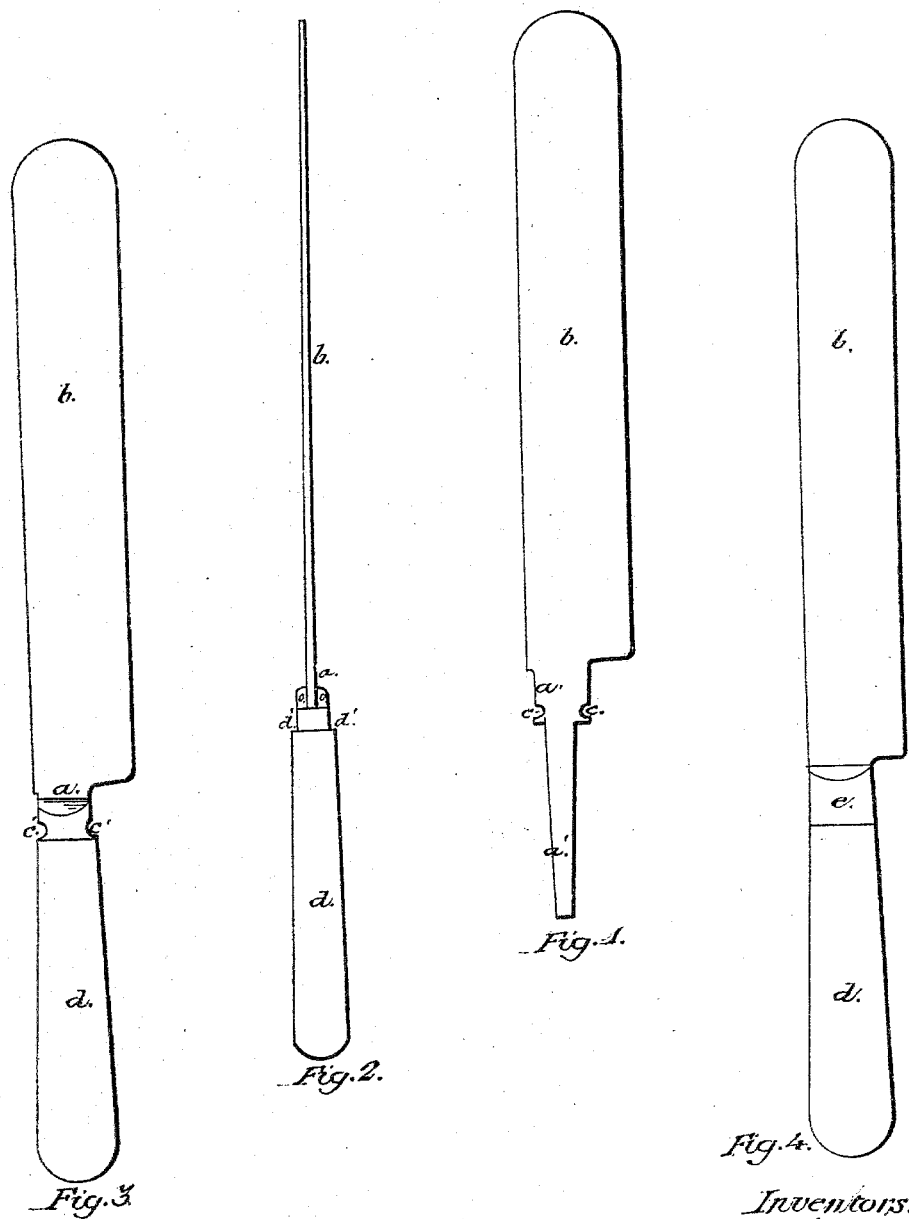

SAMUEL MASON AND EDWARD BINNS, OF BEAVER FALLS, PENNSYLVANI
TO BEAVER FALLS CUTLERY COMPANY, OF SAME PLACE

Letters Patent No. 87,787, dated March 16, 1869.

IMPROVEMENT IN TABLE-CUTLERY.

*To all whom it may concern:*

Be it known that we, SAMUEL MASON and EDWARD BINNS, of Beaver Falls, in the county of Beaver, and State of Pennsylvania, have invented a new and useful Improvement in Table-Cutlery; and we do hereby declare the following to be a full, clear, and exact description thereof.

Our invention relates to the manufacture of that class of table-cutlery in which the handle is made separate from the rest of the article; and the nature of it consists in attaching a flat and round tang of an article of cutlery to a handle made in a single piece, and bored and slitted to receive the tang, by casting a bolster around the lips of the handle and the tang, into notches or recesses cut on the edges of the lips and tang.

To enable others skilled in the art to make and use our invention, we will proceed to describe its construction and mode of operation, reference being had to the accompanying drawings, making a part of this specification, and to the letters of reference marked thereon, like letters in the different figures indicating like parts; and Figure 1 being a side view of a knife-blade made with a flat and round tang;

Figure 2 being an edge, and

Figure 3 a side view of the same, inserted in and fitted to a handle, and showing the lips around which, and the notches into which the bolster is to be cast; and Figure 4 showing, in side view, the knife complete.

$b$ is a knife-blade, made in any known way, but with a flat and round tang, $a$ $a'$.

In the opposite edges of the flat part $a$ of the tang, we make notches, $c$

The handle $d$, made of wood or other suitable material, and of a single piece, is slitted at one end, as shown in fig. 2, to receive the flat, $a$, of the tang, and its body is bored for the round, $a'$, which, in fact, may be square, or of other polygonal shape, in cross-section.

The end of the handle $d$, around the slit, is cut down or shouldered, as at $d'$, fig. 2, so as to make room for a bolster.

The lips $o$, thus made, are notcl notches being on the edges of the sponding in position with the notche is in place.

Having fitted the two neatly tog two together, in a properly-shape mould, and cast around the lips $o$ a the notches $c$ $c'$, a bolster, $c$, the fai cast, is flush, or nearly so, with the $d$, and may be ornamented or not, :

A bolster, thus cast on to a handle gives a perfectly-tight joint at both is neither joint nor seam by which oxidize the tang, or soften the han union between them. Also, no part exposed.

Riveting is wholly dispensed wit of the bolster enters the notches $c$ tang and handle from being pulled

We claim also a saving in the co and that we thus produce a neater, stronger knife, than is made by mo ing heretofore in use.

We apply our invention to the n knives, but also of other handled a niture.

What we claim as our invention cure by Letters Patent, is—

In attaching articles of cutlery t combination of a flat and round t bored, and shouldered handle $d$, w bolster $e$, the several parts being m combined, substantially as above se In testimony whereof, we, the sai and EDWARD BINNS, have hereun

SAM
EDV

Witnesses:
W. BAKEWELL,
C. O. TAYLOR.